(12) United States Patent
Kim

(10) Patent No.: US 9,486,937 B2
(45) Date of Patent: Nov. 8, 2016

(54) DIAMOND WIRE SAW

(71) Applicant: Hyo Young Kim, Gyeonggi-do (KR)

(72) Inventor: Hyo Young Kim, Gyeonggi-do (KR)

(73) Assignee: Hyo Young Kim, Gyeonggi-do (KR)

( * ) Notice: Subject to any disclaimer, the term of this patent is extended or adjusted under 35 U.S.C. 154(b) by 0 days.

(21) Appl. No.: 14/417,520

(22) PCT Filed: Jun. 27, 2013

(86) PCT No.: PCT/KR2013/005703
§ 371 (c)(1),
(2) Date: Jan. 26, 2015

(87) PCT Pub. No.: WO2014/017748
PCT Pub. Date: Jan. 30, 2014

(65) Prior Publication Data
US 2015/0209976 A1    Jul. 30, 2015

(30) Foreign Application Priority Data
Jul. 27, 2012    (KR) .......................... 10-2012-0082199

(51) Int. Cl.
*B28D 1/08*  (2006.01)
*B23D 61/18* (2006.01)

(52) U.S. Cl.
CPC ............... *B28D 1/08* (2013.01); *B23D 61/185* (2013.01)

(58) Field of Classification Search
CPC ........ B28D 1/08; B28D 5/045; B23D 61/18; B24B 27/06

USPC ................... 125/21, 22, 16.02; 451/296, 168
See application file for complete search history.

(56) References Cited

U.S. PATENT DOCUMENTS

| | | | | |
|---|---|---|---|---|
| 4,856,490 A * | 8/1989 | Kawase | ............... | B23D 61/185 125/18 |
| 4,907,564 A * | 3/1990 | Sowa | .................. | B23D 61/185 125/21 |
| 6,105,568 A * | 8/2000 | Yu | ......................... | B23D 61/185 125/16.02 |
| 6,257,223 B1 * | 7/2001 | Ghio | ..................... | B23D 65/00 125/12 |

FOREIGN PATENT DOCUMENTS

| | | |
|---|---|---|
| JP | 08-142038 | 6/1996 |
| JP | 09-225736 | 9/1997 |
| JP | 63-116222 | 7/1998 |
| JP | 2000-158232 | 6/2000 |
| JP | 2000-233318 | 8/2000 |
| JP | 2004-338023 | 12/2004 |
| KR | 100590833 | 6/2006 |

* cited by examiner

*Primary Examiner* — Robert Rose
(74) *Attorney, Agent, or Firm* — IP & T Group LLP

(57) ABSTRACT

Provided is a wire saw intended for cutting concrete, stone or the like, more particularly, a diamond wire saw which is configured such that each front of beads is formed to be curved so that the beads can appropriately respond to resistance transmitted from an object to be cut without being in direct contact with the resistance, cutting diamond layers are electrodeposited and attached to the curved portions, and a large quantity of cutting chips are accommodate and are then discharged to the outside so that the number of installed beads can be easily adjusted.

7 Claims, 4 Drawing Sheets

DIAMOND WIRE SAW

This application is a national stage application of PCT/KR2013/005703 filed on Jun. 27, 2013, which claims priority of Korean patent application number 10-2012-0082199 filed on Jul. 27, 2012. The disclosure of each of the foregoing applications is incorporated herein by reference in its entirety.

TECHNICAL FIELD

The present invention relates to a wire saw intended for cutting a steel structure such as concrete or stone. More particularly, the present invention relates to a diamond wire saw which is configured such that the fronts of beads arranged and installed in a wire at regular intervals are formed in curved surfaces, and cutting diamond layers are attached to the curved surfaces using an electrodepositing or fusion process and a sintering process so that an excellent cutting property can foe obtained, the number of beads can foe adjusted, and the beads can be prevented from being moved backward by an object to be cut when the beads are moved forward. Furthermore, each external diameter of shanks is worn down with the cutting diamond layers without being caught on the object to be cut upon cutting so that the other cutting diamond layers located at the rear can be also sequentially cut, thereby enabling the extension of a lifespan of the wire saw.

BACKGROUND ART

In general, a wire saw is used for rapidly and uniformly forming a cutting surface upon performing work for dissembling a concrete structure or cutting stone and a strong structure quarried from a quarry. As shown in FIG. 1, such a conventional wire saw 100 is configured such that beads 102 are installed on an outer circumference of a wire 101 at regular intervals, the beads being fixed to outer circumferences of shanks 104 having diamond tips 103 formed in a cylindrical shape using a fusion or electrodepositing process and a sintering process; the beads 102 and the wire 101 are protected via injection mold of the wire 101; and filling layers 104 intended for preventing the beads 102 from being rotated in a state of being separated from the wire 101 or being pushed from the wire are filled so that the diamond tips 102 can be exposed, thereby forming the wire saw 100. Thus, such a wire saw 100 is put in an object to be cut, and the object to be cut is cut by high-speed rotation of a rotating device.

The conventional wire saw as described above is disclosed in Korean Patent No. 1127447 (entitled 'Diamond endless wire rope saw and method for manufacturing the same').

That is, diamond tips are cylindricality fixed to outer circumferences of shanks formed in a cylindrical shape using a fusion or electrodepositing process and a sintering process.

However, this conventional wire saw is problematic in that the diamond tips are easily separated from, the shanks due to a cracking problem caused by resistance transmitted from the object to be cut applied to vertical surfaces of both sides of each diamond tip in a direction of the progress of cutting, and accordingly, the wire saw has a short lifespan. Due to this, it is also problematic in that a cutting cost is increased because there is a need to exchange the wire saw to another expensive wire saw.

Also, in order to discharge cutting chips generated upon cutting to the outside, since the heads should be installed at appropriate intervals, it is problematic in that it is difficult to adjust the number of beads.

Here, the most commonly used existing wire saw is produced by a sintering method. Furthermore, since the wire saw using cylindrical beads has a very low cutting speed upon cutting a hard material such as, particularly, steel, cast stainless steel or the like, it is difficult to use it. Thus, electro deposition or fusion type beads are mostly used.

However, the cylindrical bead among the electro deposition or fusion type beads has a short lifespan because one diamond layer is only attached, to a maximum outer circumferential surface, and there is a limit in increasing the number of beads because flexibility is structurally reduced in when the number of beads per a unit length is increased.

Due to such a reason, the beads break or are pushed out because they are caught on a corner of a hard material and the like. This causes a serious problem in light of safety as well as work efficiency.

Also, in a conventional electro deposition or fusion type tool, since shanks are formed in a cylindrical shape and one cutting diamond layer is only attached to an outer circumference of the cylindrical shank, it is problematic in that the cutting diamond layer comes into contact with an cut object upon cutting to cause cutting overload and the cutting diamond layer is worn down, thereby rapidly reducing a lifespan of the tool.

Furthermore, in a sintering type tool, an outer circumference is worn down, and a cutting property upon using a hard material is reduced even though the sintering type tool is used. Thus, the sintering type tool has not been used.

DISCLOSURE

Technical Problem

The present invention has been made keeping in mind the above problems. An object of the present invention is to provide a diamond wire saw which is configured such that a portion adjacent to a wire is formed in a cylindrical shape; a portion to which a cutting diamond layer is attached is composed of shanks in a funnel-like shape with each curved surface; and a cutting diamond layer is attached to an outer circumference of the curved portion using an electro deposition method or a fusion method, so that the number of beads can be easily adjusted and the beads can be prevented from being caught on a corner upon cutting. Furthermore, the diamond wire saw is configured such that even though there are many beads, cutting can be excellently performed because merely a maximum outer circumference portion is cut at the initial stage, and the curved portions of the shanks are worn down when the cutting diamond layer of the maximum outer circumferential surface is worn down so that cutting can be continuously performed by the other cutting diamond layers arranged at the rear.

Technical Solution

In order to achieve the objects, the present invention is configured as follows.

A diamond wire saw may include: a wire rope elongated in a longitudinal direction; shanks each having a curved portion formed so that a cutting diamond layer can be attached to a front surface; beads arranged and installed on an outer circumference of the wire rope at regular intervals;

and resin layers intended for coating between, the bead and the adjacent bead so that the beads can be fixed to the wire rope.

Also, the diamond wire saw may further include elastic bodies installed on an outer circumference of the wire rope to be interposed between the bead and the adjacent bead so that an appropriate distance between the bead and the adjacent bead can be maintained, and the beads pushed by cutting resistance transmitted from an object to be cut upon cutting can elastically respond to the resistance.

Also, each of the shanks may include: a hollow formed to accommodate the wire rope in a front direction of the curved portion; and a protruding portion having one end extending frontward in a predetermined length and formed to be firmly pressed and fixed to the wire rope.

Also, containing grooves filled with resin layers to be coated may be formed in the inside of the curved portions of the shanks.

Also, each of the resin layers may include an inclined portion formed to be inclined downwards from a rear surface of a front bead located at the front among the beads installed at the wire rope to a front surface of a rear bead located at the rear.

Also, extension portions filled and coated in the inside of the curved portions of the shanks may be further formed at front surfaces of the resin layers.

Also, the cutting diamond layers may be attached to external surfaces of the curved portions of the shanks using an electro deposition or fusion process.

Furthermore, the resin layers may be made of any one material of rubber or urethane, and grooves intended for concentrically fixing the beads to the wire rope may be formed in outer circumferences of the resin layers upon molding.

Advantageous Effects

As described above, according to the present invention, a diamond wire saw is advantageous in that each front of shanks constituting beads is formed in a curved portion, and a cutting diamond layer is electrodeposited and attached to the curved portion so that resistance transmitted from an object to be cut can be applied to the soft curved portion rather than a conventional vertical surface, thereby preventing the cutting diamond layer from being damaged. Furthermore, it is advantageous in that noise generated from the contact of the object to be cut and the conventional vertical surface can be prevented, and a lifespan of the product can be increased because wear is sequentially performed.

Also, it is advantageous in that each of resin layers is formed to be inclined so as to have a space at a rear side of a direction of progress of the resin layer so that the beads can be supported, cutting chips can be accommodated and discharged, and the number of beads installed along an inclined length can be adjusted.

Also, since the elastic body is interposed between the bead and the adjacent bead so as to support the beads, it is advantageous in that the heads can appropriately elastically respond to resistance transmitted from the object to be cut upon cutting.

BRIEF DESCRIPTION OF DRAWINGS

FIG. is a cross-sectional view illustrating a conventional wire saw.

DETAILED DESCRIPTION

Figure 1:
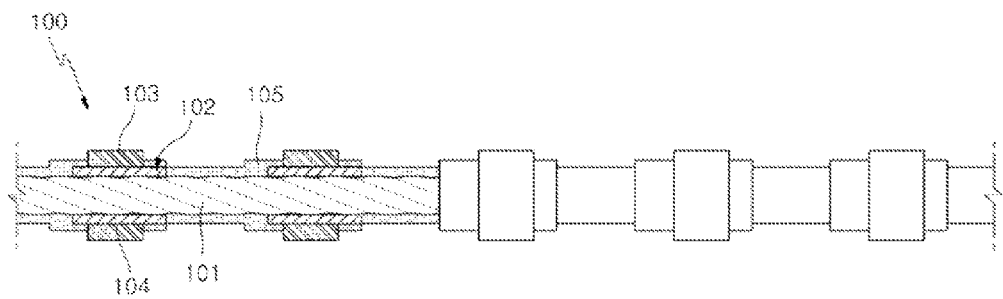
Figure 2:
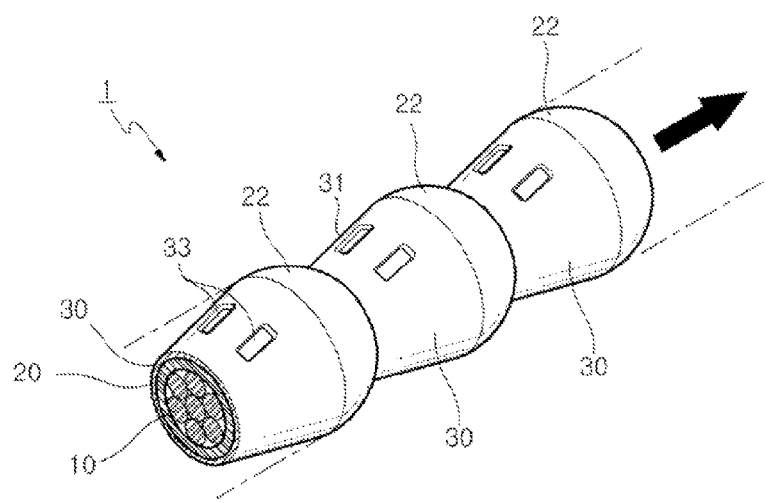
FIG. 2 is a perspective view illustrating a portion of a wire saw according to the present invention.

Exemplary embodiments of the present disclosure will now be described in detail with reference to the accompanying drawings.

As shown in FIGS. 2 to 5, a wire saw 1 according to the present invention may largely include: a wire rope 10; beads 20 installed on an outer circumference of the wire rope 10; and resin layers 30 intended for fixing the beads 20 to the wire rope 10.

Furthermore, the wire saw may further include elastic bodies 40 interposed between the bead 20 and the adjacent bead 20 and installed on the outer circumference of the wire rope 10.

The wire rope 10 is elongated in a longitudinal direction, and the wire saw 1 is put into a cutting hole or a cutting groove formed in the object to be cut so that the object to be cut can be cut by the high-speed rotation of a rotating device mounted.

Figure 3:
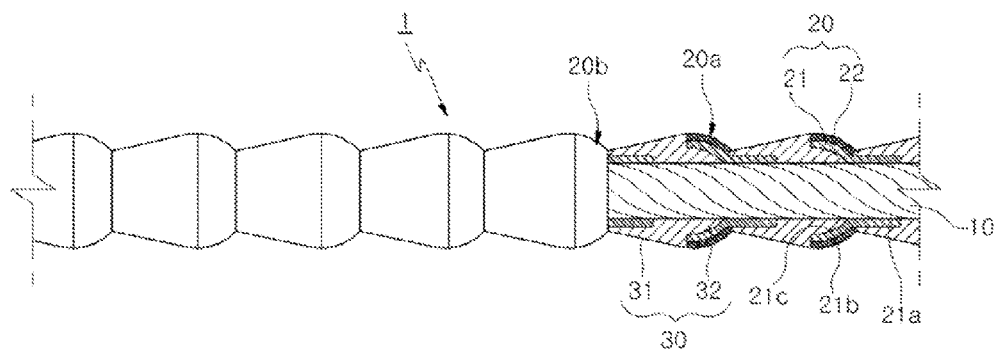
FIG. 3 is a cross-sectional view illustrating the wire saw according to the present invention.

As shown in FIG. 3, the beads 20 may composed of shanks 21 arranged and installed on an outer circumference of the wire rope 10 at regular intervals and cutting diamond layers 22 attached to the shanks 21.

The shank 21 is formed in a cylindrical shape having an inner part formed in a hollow form so as to receive the wire rope and includes a protruding portion 21a having one end extending frontward in a predetermined length, namely, the front corresponding to a cutting direction of the wire saw 1, and a curved portion 21b formed at another end of the protruding portion 21a to nave a relatively larger diameter than a diameter of the protruding portion 21a and curved upwards from the front to the rear.

Figure 4:
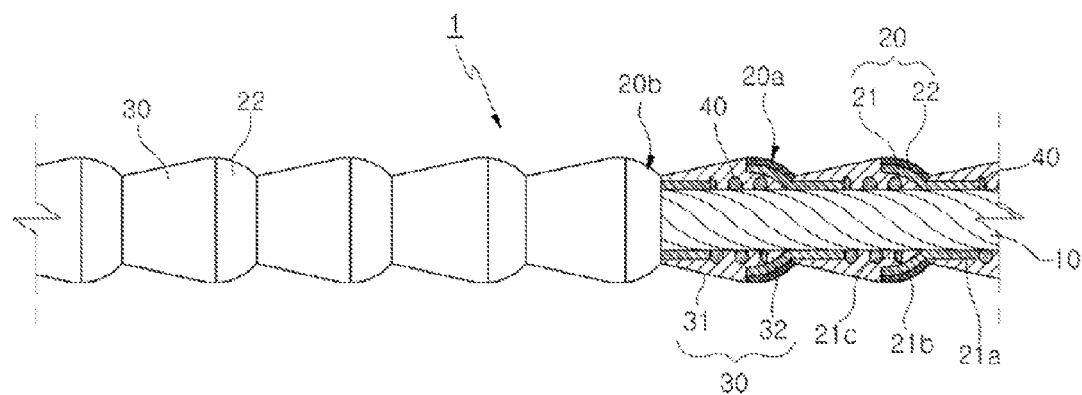
FIG. 4 is a cross-sectional view illustrating a state where an elastic body is installed at the wire saw of FIG. 3.
Figure 5:
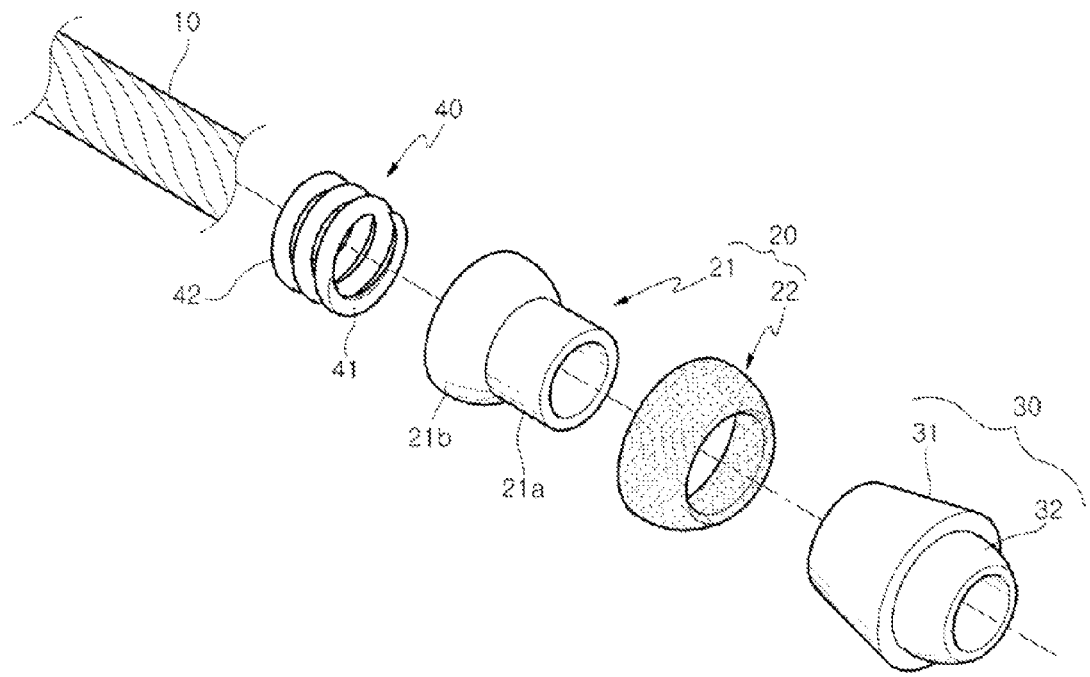
FIG. 5 is an exploded perspective view of FIG. 4.
Figure 6:
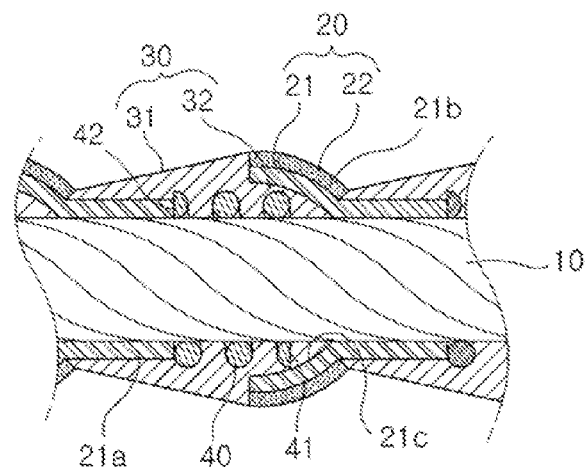
FIG. 6 is an enlarged cross-sectional view illustrating a main portion extracted from the wire saw of FIG. 4.

Also, as shown in FIG. 4, a containing groove 21c filled with the resin layer 30 coated to fix the bead 20 is further formed in the inside of the curved portion 21b so that a coating area of the shank 21 can be increased, the shank can be more stably fixed to the wire rope 10, and the shank 21 can appropriately respond to cutting resistance generated upon cutting.

As shown in FIGS. 2 to 6, the cutting diamond layer 22 is attached to a surface of the curved portion 21b of the shank 21 constituting the bead 20 via electro deposition and is formed to be curved as the curved portion 21b.

The resin layer 30 is coated between the bead 20 and the adjacent bead 20. For the understanding of description, the bead 20 installed at the wire rope 10 is divided into a front bead 20a located at the front and a rear bead 20b located at the rear as shown in FIGS. 3 and 4.

An inclined portion 31 inclined downwards from an entire rear surface of the front bead 20a to a front surface of the rear bead 20b is formed at an outer side.

For example, the resin layer 30 is entirely applied to the bead 20 so that the inclined portion 31 can enable chips cut by the cutting diamond layer 22 to be collected in the inclined portion 31 of the front and to be easily discharged, and a front surface and a upper surface cut by the cutting diamond layer 22 can be exposed.

Here, an extension portion 32 is further formed at the front surface of the shank 21 in which the containing groove 21c is formed so that the resin layer 30 can flow and can be filled in the containing groove 21c.

Upon manufacturing the wire saw 1, grooves 33 formed at an outer surface of the resin layer 30 are formed in such a manner that a pin fixing the wire rope 10, the bead 20 and the elastic body 40 is pulled out when the liquid resin layer 30 is solidified.

The resin layer 30 should be made of a material that enables fixation of the wire rope 10 and the bead 20 and has rigidity so that the resin layer can respond to cutting resistance transmitted from, the object to be cut. Preferably, the resin layer may be made of a material such as rubber or urethane.

The elastic body 40 is composed of a coil compression spring so as to accommodate the outer circumference of the wire rope 10. Such an elastic body is installed so that an appropriate distance can be maintained, between the bead 20 and the adjacent bead 20. Furthermore, the elastic body is installed so as to appropriately respond to the bead 20 pushed backward by cutting resistance transmitted from, the object to be cut upon cutting by using a compression elastic force.

Reviewing the installation state of the elastic body 40, one end 41 of the elastic body is formed to support a rear end of the shank 21, and anther end 42 of the elastic body is installed to support a front end of the protruding portion 21a of the shank 21. Furthermore, when the containing groove 21c is formed in the shank 21, the elastic body is installed such that the one end of the elastic body 40 is inserted into the containing groove 21c so as to support the shank.

Cutting work of the wire saw configured as described above is reviewed as follows.

Figure 7:
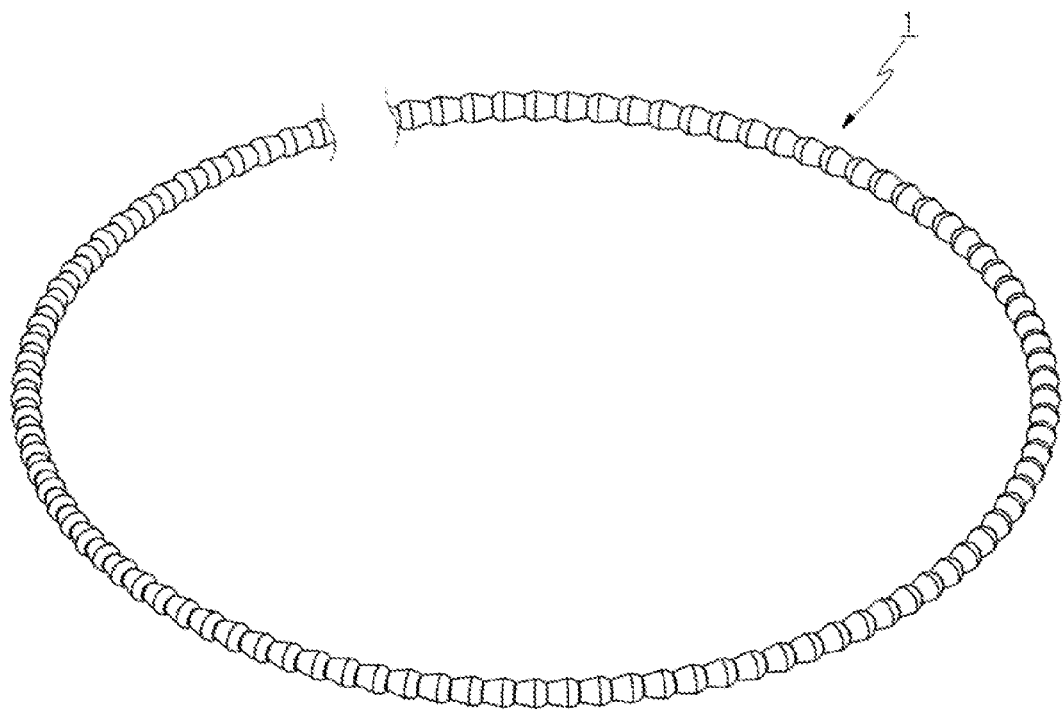
FIG. 7 is a perspective view illustrating the wire saw according to the present invention.
Figure 8:
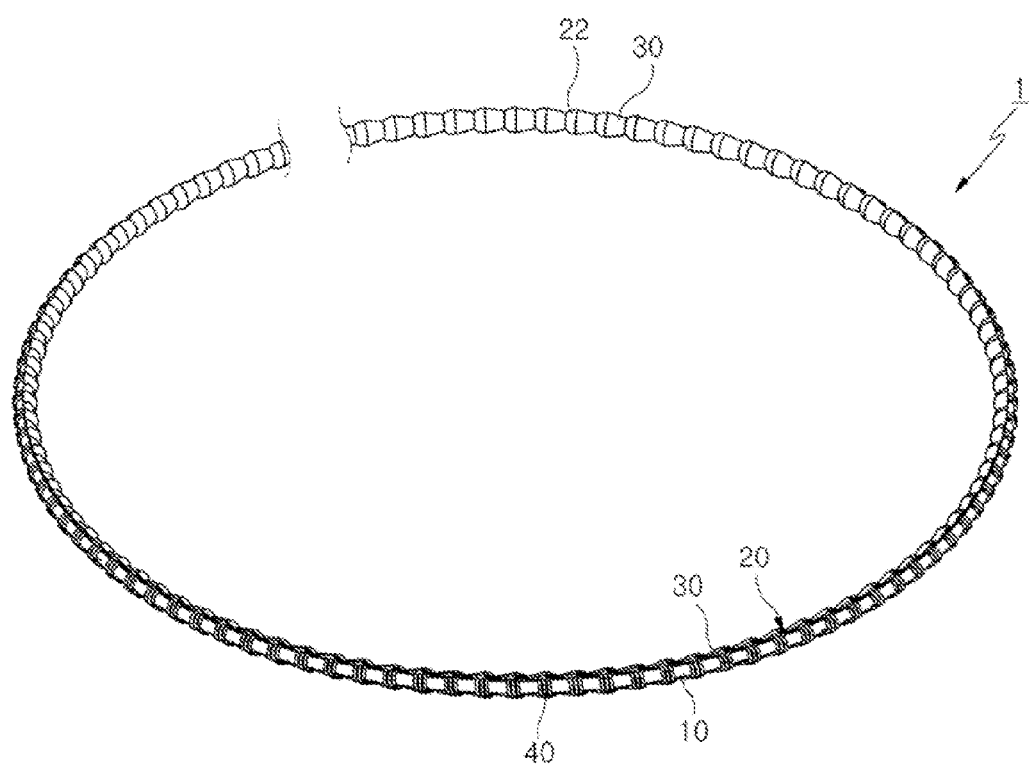
FIG. 8 is a perspective view illustrating a total cross section in which a portion of the beads and the resin layer is removed.

First, a cutting hole or a cutting groove is formed in the object to be cut, and as shown in FIGS. 7 and 8, the wire saw 1 prepared in a circular ring-like shape is put in the cutting hole or the cutting grove, the cutting process is ready to be performed by mounting a rotating device.

Then, when the rotating device is operated, the wire saw 1 is rotated at high speed so that the object to be cut can be cut by the cutting diamond layer 22 of the front bead 20a located at the front. Cutting chips generated upon the cutting are collected in the inclined portion 31 of the front resin layer 30 and are then discharged to the outside.

At this time, when the front bead 20a comes into contact with the cut object, cutting resistance is generated from the cut object. The front bead 20a is pushed backward by the cutting resistance so that the elastic body 40 having a supporting function can be slightly compressed, and the bead can respond to the cutting resistance, thereby preventing the bead 20 from being damaged.

Furthermore, thanks to the resin layer 30 coated between the front and rear beads 20a, 20b, the bead 20 may be further prevented from being pushed backward.

As such, the cutting diamond layer 22 is attached to the front curved portion 21b of the shank 21 using an electrode deposition process so that the high-priced cutting diamond layer 22 can be prevented from being damaged and the useful wire saw 1 having a longer lifespan can be provided.

The present invention may be exemplified in many different forms within the allowable scope of the technical idea and should not be construed as being limited to the specific embodiments set forth herein. Rather, these embodiments are provided so that this disclosure will be thorough and complete, and will fully convey the scope of the disclosure to those skilled in the art.

[Description of the Reference Numerals in the Drawings]

| | |
|---|---|
| Wire saw: 1 | Wire rope: 10 |
| Bead: 20 | Shank: 21 |
| Protruding portion: 21a | Curved portion: 21b |
| Containing groove: 21c | Cutting diamond layer: 22 |
| Resin layer: 30 | Inclined portion: 31 |
| Extension portion: 32 | Groove: 33 |
| Elastic body: 40 | One end: 41 |
| Another end: 42 | |

What is claimed is:

1. A diamond wire saw, comprising:
   a wire rope elongated in a longitudinal direction;
   shanks each having a curved portion formed so that a cutting diamond layer can be attached to a front surface;
   beads arranged and installed on an outer circumference of the wire rope at regular intervals; and
   resin layers coated between the bead and the adjacent bead so that the beads can be fixed to the wire rope,
   wherein containing grooves filled with the resin layers to be coated are further formed in the inside of the curved portions of the shanks.

2. The diamond wire saw of claim 1, further comprising elastic bodies installed on an outer circumference of the wire rope to be interposed between the bead and the adjacent bead so that an appropriate distance between the bead and the adjacent bead can be maintained, and the beads pushed by cutting resistance transmitted from an object to be cut upon cutting can elastically respond to the resistance.

3. The diamond wire saw of claim 1, wherein each of the shanks includes:
   a hollow formed to accommodate the wire rope in a front direction of the curved portion; and
   a protruding portion having one end extending frontward in a predetermined length and formed to be firmly pressed and fixed to the wire rope.

4. The diamond wire saw of claim 1, wherein each of the resin layers includes an inclined portion formed to be inclined downwards from a rear surface of a front bead located at the front among the beads installed at the wire rope to a front surface of a rear bead located at the rear.

5. The diamond wire saw of claim 4, wherein extension portions filled and coated in the inside of the curved portions of the shanks are further formed at front surfaces of the resin layers.

6. The diamond wire saw of claim 1, wherein the cutting diamond layers are electrodeposited and attached to external surfaces of the curved portions of the shanks using an electro deposition or fusion process.

7. The diamond wire saw of claim 1, wherein the resin layers are made of any one material of rubber or urethane, and grooves intended for concentrically fixing the beads to the wire rope are formed in outer circumferences of the resin layers upon molding.

* * * * *